(12) United States Patent
Zhao et al.

(10) Patent No.: US 10,561,865 B2
(45) Date of Patent: Feb. 18, 2020

(54) SMART MASK, METHOD, SMART MASK AND APPARATUS FOR CALCULATING POLLUTANT ABSORPTION QUANTITY

(71) Applicant: Xiaomi Inc., Beijing (CN)

(72) Inventors: Tong Zhao, Beijing (CN); Qun Tao, Beijing (CN); Huayijun Liu, Beijing (CN)

(73) Assignee: Xiaomi Inc., Beijing (CN)

(*) Notice: Subject to any disclaimer, the term of this patent is extended or adjusted under 35 U.S.C. 154(b) by 918 days.

(21) Appl. No.: 15/183,470

(22) Filed: Jun. 15, 2016

(65) Prior Publication Data
US 2017/0028231 A1    Feb. 2, 2017

(30) Foreign Application Priority Data

Jul. 31, 2015    (CN) .......................... 2015 1 0462890

(51) Int. Cl.
*A62B 23/02*    (2006.01)
*G01L 5/00*    (2006.01)

(52) U.S. Cl.
CPC .......... *A62B 23/025* (2013.01); *G01L 5/0038* (2013.01)

(58) Field of Classification Search
CPC ..... A62B 23/025; A62B 9/006; A62B 18/088; A62B 23/02; H04W 4/80; H04W 76/10; A41D 13/11; G01L 5/0038
See application file for complete search history.

(56) References Cited

U.S. PATENT DOCUMENTS

| 7,860,662 B2* | 12/2010 | Parham | A62B 9/006 128/202.22 |
|---|---|---|---|
| 8,085,144 B2* | 12/2011 | Appelt | A61B 5/02055 128/201.22 |
| 9,170,625 B1* | 10/2015 | Gettings | G05B 15/02 |
| 9,322,684 B2* | 4/2016 | Pike | G09B 9/003 |
| 2007/0130676 A1 | 6/2007 | Von Blucher | |
| 2010/0153023 A1 | 6/2010 | Parham et al. | |
| 2015/0082914 A1 | 3/2015 | Pike | |

(Continued)

FOREIGN PATENT DOCUMENTS

| CN | 103404982 A | 11/2013 |
|---|---|---|
| CN | 103815588 A | 5/2014 |
| CN | 203873049 U | 10/2014 |

(Continued)

OTHER PUBLICATIONS

First Office Action issued by the State Intellectual Property Office of the People's Republic of China (SIPO) dated Apr. 18, 2016, in counterpart Chinese Application No. 201510462890.2.

(Continued)

*Primary Examiner* — Steven O Douglas
(74) *Attorney, Agent, or Firm* — Finnegan, Henderson, Farabow, Garrett & Dunner, L.L.P.

(57) ABSTRACT

A smart mask includes a main mask body including a first opening end and a second opening end. A diameter of the first opening end is smaller than a diameter of the second opening end. The mask further includes a front mask body arranged at the first opening end and fixing straps arranged at the second opening end. The front mask body includes a filter configured to absorb pollutants in air entering the front mask body and a sensor configured to record a wearing time of the smart mask.

17 Claims, 6 Drawing Sheets

(56) References Cited

U.S. PATENT DOCUMENTS

2018/0256926 A1* 9/2018 Kyung ................. A62B 18/02

FOREIGN PATENT DOCUMENTS

| | | |
|---|---|---|
| CN | 204181009 U | 3/2015 |
| CN | 204363022 U | 6/2015 |
| CN | 104792675 A | 7/2015 |
| CN | 105029769 A | 11/2015 |
| EP | 0252988 A1 | 1/1988 |
| JP | H 3-207425 A | 9/1991 |
| JP | 2009-136521 A | 6/2009 |
| JP | 2009-153726 A | 7/2009 |
| JP | 2011-78605 A | 4/2011 |
| JP | 2013-75157 A | 4/2013 |
| JP | 2013-537812 A | 10/2013 |
| JP | 2015-70962 A | 4/2015 |
| JP | 2015-110065 A | 6/2015 |
| RU | 2460556 C2 | 9/2012 |
| WO | WO 02/13946 A2 | 2/2002 |
| WO | WO 2010/108328 A1 | 9/2010 |

OTHER PUBLICATIONS

Second Office Action issued by the State Intellectual Property Office of the People's Republic of China (SIPO) dated Sep. 20, 2016, in counterpart Chinese Application No. 201510462890.2.

International Search Report and Written Opinion issued by the State Intellectual Property Office of the People's Republic of China (SIPO) dated Apr. 27, 2016, in counterpart International Application No. PCT/CN2015/099049.

English translation of International Search Report issued by the State Intellectual Property Office of the People's Republic of China (SIPO) dated Apr. 27, 2016, in counterpart International Application No. PCT/CN2015/099049.

Extended European Search Report issued by the European Patent Office dated Dec. 7, 2016, in counterpart European Patent Application No. 16181979.2-1659.

Korean Office Action dated Feb. 13, 2018, in counterpart Korean Application No. 10-2016-7028664.

Japanese Office Action dated Nov. 14, 2017, in counterpart Japanese Application No. 2016-535236.

* cited by examiner

Fig. 8

SMART MASK, METHOD, SMART MASK AND APPARATUS FOR CALCULATING POLLUTANT ABSORPTION QUANTITY

CROSS-REFERENCE TO RELATED APPLICATIONS

This application is based on and claims priority to Chinese Patent Application No. 201510462890.2, filed on Jul. 31, 2015, the entire contents of which are incorporated herein by reference.

FIELD

The present disclosure relates to terminal technology and, more particularly, to a smart mask, a method, smart mask and apparatus for calculating a pollutant absorption quantity.

BACKGROUND

With the development of technology, pollution caused by industrial production has become more and more severe. The concentration of pollutants, such as PM (Fine Particulate Matter) 2.5, increases year by year, and people are more likely to suffer from various respiratory diseases. Masks can filter the air entering lungs of users to some extent and effectively prevent air pollutants, such as toxic gases and dust, from entering the lungs. Therefore, masks have become an important means for protecting health.

SUMMARY

In accordance with the present disclosure, there is provided a smart mask including a main mask body including a first opening end and a second opening end. A diameter of the first opening end is smaller than a diameter of the second opening end. The mask further includes a front mask body arranged at the first opening end and fixing straps arranged at the second opening end. The front mask body includes a filter configured to absorb pollutants in air entering the front mask body and a sensor configured to record a wearing time of the smart mask.

Also in accordance with the present disclosure, there is provided a smart mask including a processor and a memory storing instructions that, when executed by the processor, cause the processor to record a wearing time during which a user wears the smart mask and send the wearing time to a terminal.

Also in accordance with the present disclosure, there is provided an apparatus for calculating a pollutant absorption quantity. The apparatus includes a processor and a memory storing instructions that, when executed by the processor, cause the processor to receive a wearing time sent by a smart mask, obtain a local air quality index during the wearing time, and calculate the pollutant absorption quantity according to the wearing time and the local air quality index during the wearing time.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
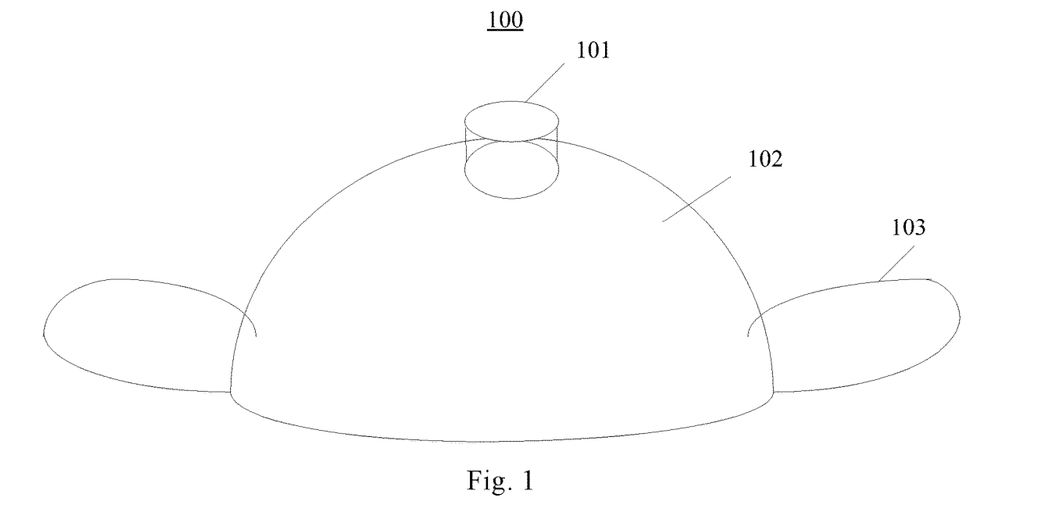
FIG. 1 is a schematic diagram of a smart mask according to an exemplary embodiment.

FIG. 1 schematically shows a smart mask 100 according to an exemplary embodiment. The smart mask 100 includes a front mask body 101, a main mask body 102, and fixing straps 103.

Figure 2A:
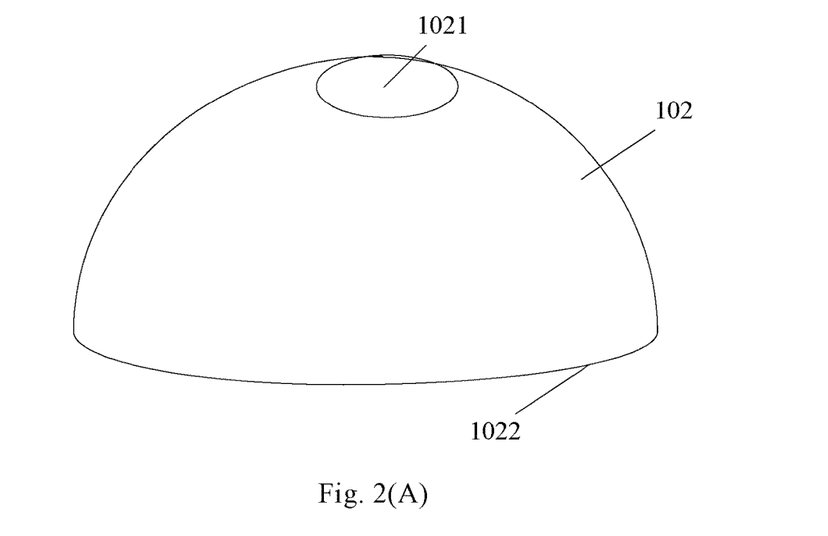
FIG. 2(A) is a schematic diagram of a main mask body of the smart mask.

FIG. 2(A) is a perspective view of the main mask body 102. As shown in FIG. 2(A), the main mask body 102 includes a first opening end 1021 and a second opening end 1022. The diameter of the first opening end 1021 is smaller than the diameter of the second opening end 1022. The front mask body 101 is arranged at the first opening end 1021 of the main mask body 102, and the fixing straps 103 are arranged at the second opening end 1022 of the main mask body 102.

Figure 2B:
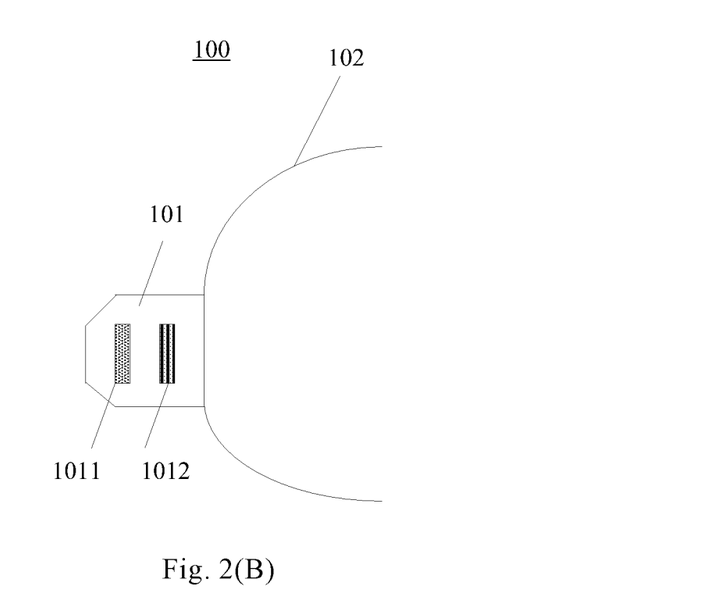
FIG. 2(B) is a schematic diagram showing a side view of a smart mask according to another exemplary embodiment.

FIG. 2(B) is a side view of an example of the smart mask 100. In the example shown in FIG. 2(B), a filter 1011 and a sensor 1012 are arranged in sequence inside the front mask body 101. The filter 1011 is configured to absorb pollutants in the air entering the front mask body 101 and the sensor 1012 is configured to record a wearing time of the smart mask. In some embodiments, the sensor 1012 can include a pressure sensor, a touch force sensor, or the like.

The fixing straps 103 are configured to fix the smart mask 100 over a user's nose and mouth at the second opening end 1022 to form a closed cavity between the main mask body 102 and the user's nose and mouth.

Figure 2C:
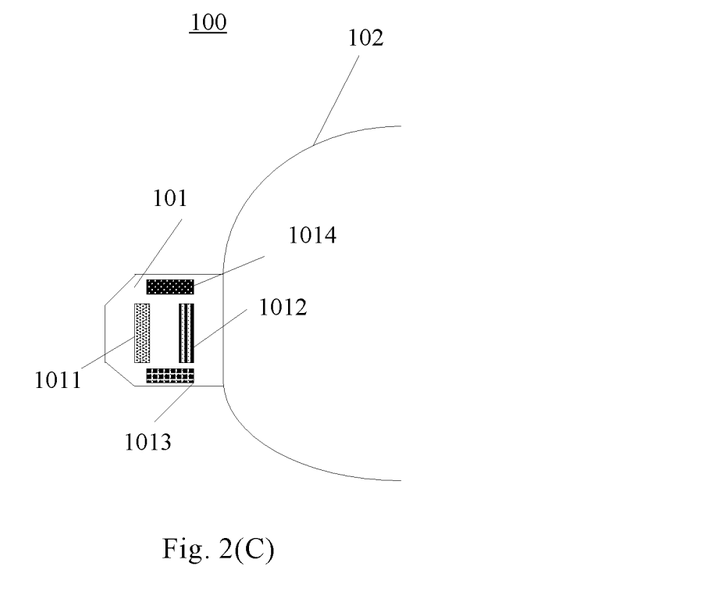
FIG. 2(C) is a schematic diagram showing a side view of a smart mask according to another exemplary embodiment.

FIG. 2(C) is a side view of another example of the smart mask 100. The example shown in FIG. 2(C) is similar to the example shown in FIG. 2(B), except that in the example shown in FIG. 2(C), a processor 1013 and a battery 1014 are further arranged inside the front mask body 101. Referring to FIG. 2(C), the processor 1013 and the battery 1014 are arranged on an inner wall of the front mask body 101. The processor 1013 includes an integrated circuit board, such as a printed circuit board (PCB) or a single-chip microcomputer, and a connecting module. The processor 1013 is a control center of the smart mask 100 and is configured to, for example, control the sensor 1012 to record the wearing time of the smart mask 100 or control pairing connections of the connecting module and a terminal. The battery 1014 is configured to, for example, supply power to the processor 1013.

In some embodiments, the connecting module includes, for example, at least one of a Bluetooth module, an infrared module, or a near field communication (NFC) module.

With the filter 1011 and the sensor 1012 arranged inside the front mask body 101, the smart mask 100 can absorb pollutants in the air entering the front mask body 101, and record the wearing time of the smart mask 100.

Figure 3:
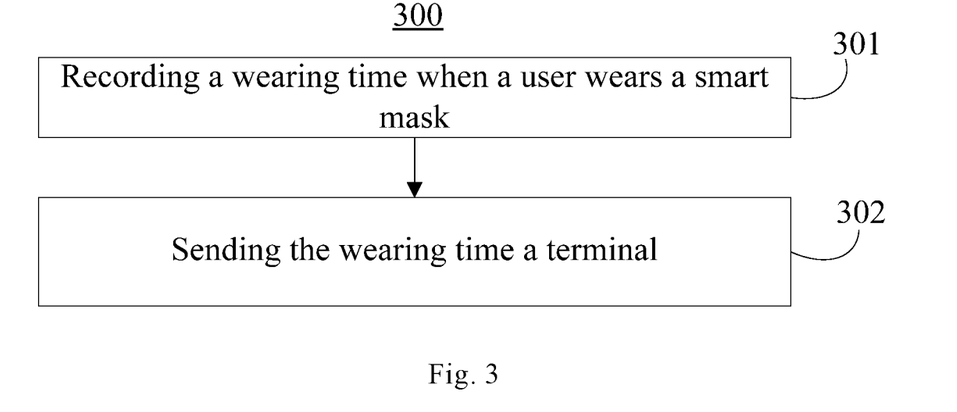
FIG. 3 is a flow chart of a method for calculating a pollutant absorption quantity according to an exemplary embodiment.

FIG. 3 is a flow chart of a method 300 for calculating a pollutant absorption quantity according to an exemplary embodiment. The method 300 can be implemented, for example, in a smart mask, such as one of the exemplary smart masks 100 described above. As shown in FIG. 3 at 301, a wearing time is recorded when a user wears the smart mask. At 302, the wearing time is sent to a terminal for the terminal to calculate the pollutant absorption quantity according to the wearing time and a local air quality index during the wearing time.

In some embodiments, before the wearing time is sent to the terminal, a Bluetooth function of the smart mask is started to establish a connection with the terminal via Bluetooth signals. Alternatively, an NFC function of the smart mask is started to establish a connection with the terminal via an NFC data channel. Alternatively, an infrared function of the smart mask is started to establish a connection with the terminal via infrared signals.

In some embodiments, the above-described alternative technical solutions can be combined, and the details of the combination are omitted here.

Figure 4:
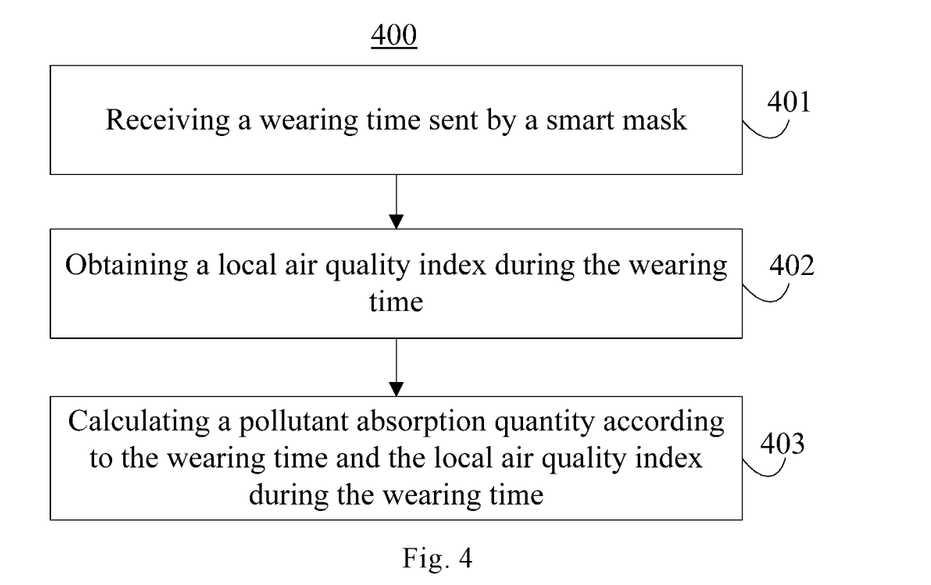
FIG. 4 is a flow chart of a method for calculating a pollutant absorption quantity according to another exemplary embodiment.

FIG. 4 is a flow chart of a method 400 for calculating a pollutant absorption quantity according to another exemplary embodiment. The method 400 can be implemented, for example, in a terminal. As shown in FIG. 4, at 401, a wearing time sent by a smart mask is received. The wearing time is recorded by a built-in sensor of the smart mask. At 402, a local air quality index during the wearing time is obtained. At 403, the pollutant absorption quantity is calculated according to the wearing time and the local air quality index during the wearing time.

In some embodiments, before receiving the wearing time sent by the smart mask, the terminal can start a Bluetooth function to establish a connection with the smart mask via Bluetooth signals, start an NFC function to establish a connection with the smart mask via an NFC data channel, or start an infrared function to establish a connection with the smart mask via infrared signals.

In some embodiments, the terminal can obtain the local air quality index via the Internet or by a built-in air sensor.

In some embodiments, to calculate the pollutant absorption quantity, the terminal can obtain a respiratory volume of a user in a first unit time; calculate a gross pollutant quantity according to the wearing time, the local air quality index during the wearing time, and the respiratory volume of the user in the first unit time; and obtaining the pollutant absorption quantity according to the gross pollutant quantity and a filtration efficiency of a filter of the smart mask.

In some embodiments, to obtain the respiratory volume of the user in the first unit time, the terminal can obtain respiratory parameters, such as a number of breaths and a respiratory volume of every breath, of the user in a second unit time, and calculate the respiratory volume of the user in the first unit time according to the number of breaths in the second unit time and the respiratory volume of every breath.

In some embodiments, to obtain the respiratory parameters of the user in the second unit time, the terminal can obtain a motion state of the user and determine the respiratory parameters of the user in the second unit time according to the motion state of the user.

In some embodiments, to obtain the motion state of the user, the terminal can receive a physiological parameter of the user sent by a wearable device and determine the motion state of the user according to the physiological parameter. Alternatively, the terminal can determine the motion state of the user according to a motion state of the terminal obtained by a built-in gravity sensor. Alternatively, the terminal can determine the motion state of the user according to a movement speed of the user detected by a built-in speed sensor.

In some embodiments, after calculating the pollutant absorption quantity, the terminal can upload the pollutant absorption quantity to a server, which determines an absorption quantity ranking according to pollutant absorption quantities uploaded by various terminals and returns the absorption quantity ranking to the terminal. The terminal receives the absorption quantity ranking returned by the server.

The above alternative technical solutions can be combined as needed to form alternative embodiments of the present disclosure, which will not be elaborated here.

Figure 5:
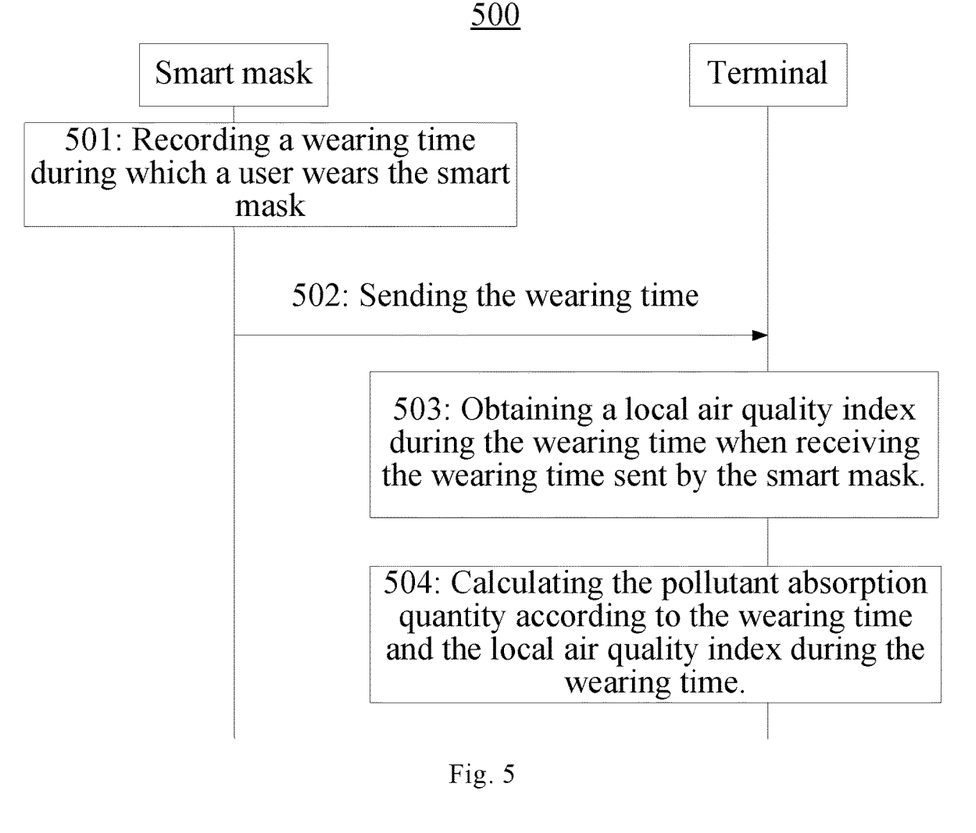
FIG. 5 is a flow chart of a method for calculating a pollutant absorption quantity according to another exemplary embodiment.

FIG. 5 is a flow chart of a method 500 for calculating a pollutant absorption quantity according to another exemplary embodiment. The method 500 can be implemented, for example in a terminal and a smart mask. As shown in FIG. 5, at 501, the smart mask records a wearing time during which a user wears the smart mask. The smart mask is internally provided with a sensor that can be a pressure sensor, a touch force sensor, or the like. When the user wears the smart mask, fixing straps of the smart mask fix the smart mask over the user's nose and mouth, such that the nose or the mouth touches the sensor. The sensor detects a pressure change and records a time point when the pressure changes. When the user takes off the smart mask, the sensor detects no pressure and records a time point when the pressure becomes zero. The time period between the time point of the pressure change and the time point when the pressure becomes zero is set as the wearing time during which the user wears the smart mask. The unit of the wearing time can be hours, minutes, or seconds.

At 502, the smart mask sends the wearing time to the terminal. The smart mask is provided with a processor, which includes a connecting module, such as a Bluetooth module, a NFC module, an infrared module, or the like, configured to establish a connection with the terminal having a connection function, such as a mobile phone, a tablet computer, or the like.

For example, the smart mask and the terminal start the Bluetooth function, and discover each other in a device discovery stage. The smart mask broadcasts a Bluetooth signal. After receiving the Bluetooth signal, the terminal establishes a connection with the smart mask according to the Bluetooth signal broadcast by the smart mask.

As another example, the smart mask and the terminal start the NFC function, and an NFC data channel is established by exchanging data packages. Thus, the smart mask and the terminal are connected with each other using the NFC data channel.

As a further example, the smart mask and the terminal start the infrared function, and discover each other in a device discovery stage. The smart mask sends an infrared signal. After receiving the infrared signal, the terminal establishes a connection with the smart mask according to the infrared signal sent by the smart mask.

At 503, the terminal obtains a local air quality index during the wearing time after receiving the wearing time sent by the smart mask. The air quality index refers to concentrations of fine particles, $SO_2$, $NO_2$, ozone, and CO in air and has a unit of microgram per cubic meter. In some embodiments, when receiving the wearing time sent by the smart mask, the terminal can determine the location of the terminal by a Global Positioning System (GPS), and obtain the local air quality index during the wearing time from the Internet according to the wearing time and the location of the terminal. The terminal can obtain the local air quality index during the wearing time by invoking data released by a local observatory according to the GPS data. The terminal can also monitor an all-day air quality index at the location of the terminal via a built-in air sensor, and store the monitored air quality index in a database. The terminal can then obtain the local air quality index during the wearing time from the database after receiving the wearing time sent by the smart mask.

At 504, the terminal calculates the pollutant absorption quantity according to the wearing time and the local air quality index during the wearing time. In some embodiments, the pollutant absorption quantity of the smart mask depends not only on the wearing time and the local air quality index during the wearing time, but also on the filtration performance of the smart mask. Therefore, these factors are considered together to improve the accuracy of calculating the pollutant absorption quantity of the smart mask. The filtration performance of the smart mask mainly refers to the filtration efficiency of the filter in the smart mask.

In some embodiments, to calculate the pollutant absorption quantity according to the wearing time, the local air quality index during the wearing time, and the filtration efficiency of the filter of the smart mask, the terminal first obtains a respiratory volume of the user in a first unit time. The first unit time can be, for example, an hour, a minute, or a second. The respiratory volume represents an air amount breathed by the user in the first unit time and is associated with respiratory parameters of the user in the first unit time. The respiratory parameters include the number of breaths and a respiratory volume of every breath.

Specifically, to obtain the respiratory volume of the user in the first unit time, the terminal first obtains the respiratory parameters of the user in a second unit time. The second unit time is shorter than the first unit time, and can be, for example, a minute or a second. The number of breaths per minute and the respiratory volume of every breath are usually related to a motion state of the user. The more intense the motion is, the more breaths per minute there are and the larger the respiratory volume of every breath is. For example, when the user is jogging, the number of breaths per minute can be 20 and respiratory volume of every breath can be 0.6 liter. When the user is walking, the number of breaths per minute can be 15 and the respiratory volume of every breath can be 0.5 liter. Therefore, the terminal can first obtain the motion state of the user.

In some embodiments, the motion state of the user can be obtained through a wearable device having a built-in sensor that is worn by the user. Different physiological parameters of the user can be detected by the built-in sensor. The motion state of the user can be determined according to the detected physiological parameters. Specifically, the wearable device can detect a range of motion and a motion frequency of limbs and trunk of the user, and determine the motion state of the user according to the detected range of motion and the motion frequency. For example, if the wearable device detects that the range of motion is large and the motion frequency is high, it can be determined that the user is engaged in an intense exercise. On the other hand, if the wearable device detects that the range of motion is small and the motion frequency is low, it can be determined that the user is engaged in a gentle exercise. In some embodiments, the wearable device can detect the respiratory rate of the user and determine the motion state of the user thereby. For example, if the wearable device detects that the user is breathing quickly, it can be determined that the user is engaged in an intense exercise. On the other hand, if the wearable device detects that the user is breathing calmly, it can be determined that the user is engaged in a gentle exercise.

In some embodiments, the terminal is internally provided with a gravity sensor that can detect its own gravity center shift. The terminal can obtain its own motion state according to the gravity center shift detected by the gravity sensor. Usually, when the user carries the terminal, the motion state of the terminal can reflect the motion state of the user. Therefore, the terminal can determine the motion state of the user according to the gravity center shift detected by the gravity sensor.

In some embodiments, the terminal is internally provided with a speed sensor that can detect a movement speed of the user and thus determine the motion state of the user. For example, if it is detected that the movement speed of the user is high, it can be determined that the user is engaged in an intense exercise, such as running, playing badminton, or the like. On the other hand, if it is detected that the movement speed of the user is slow, it can be determined that the user is engaged in a gentle exercise, such as walking.

Usually, different numbers of breaths per minute and different respiratory volumes of every breath are associated with different motion states. Therefore, the terminal can determine the number of breaths per minute and the respiratory volume of every breath according to the motion state of the user. Table 1 shows the respiratory parameters of the user in different motion states.

TABLE 1

| Motion state | Number of breaths per minute | Respiratory volume of every breath (liter) |
| --- | --- | --- |
| Jogging | 20 | 0.6 |
| Walking | 15 | 0.5 |
| Running | 25 | 0.8 |

According to the respiratory parameters of the user listed in Table 1, if the motion state of the user is walking, it can be determined that the number of breaths per minute is 15 and the respiratory volume of every breath is 0.5 liter.

After obtaining the number of breaths in the second unit time and the respiratory volume of every breath, the terminal calculates the respiratory volume of the user in the first unit time according to the number of breaths in the second unit time and the respiratory volume of every breath of the user. For example, if the first unit time is one hour and the second unit time is one minute, then $$\text{Respiratory volume per hour (liter/hr)} = \text{Respiratory volume of every breath (liter)} \times \text{Number of breaths per minute (min}^{-1}) \times 60$$

Usually the pollutant absorption quantity is calculated with cubic meter as the unit. Thus, the above-calculated respiratory volume per hour in liters can be converted to a respiratory volume per hour in cubic meters.

For example, if the terminal determines that the user is jogging, then according to Table 1, the number of breaths per minute is 20 and the respiratory volume of every breath is 0.6 liter. The terminal can calculate the respiratory volume per hour to be 0.72 m³.

After obtaining the respiratory volume in the first unit time, the terminal calculates a gross pollutant quantity according to the wearing time, the local air quality index during the wearing time, and the respiratory volume of the user in the first unit time. For example, if the first unit time is one hour, then $$\text{Gross pollutant quantity (μg)} = \text{Wearing time (hr)} \times \text{Air quality index (μg/m}^3) \times \text{Respiratory volume per hour (m}^3/\text{hr)}.$$

For example, if the user wears the smart mask for 2 hours, the air quality index is 0.5 μm/m³ and the respiratory volume per hour is 0.8 m³, the terminal can calculate the gross pollutant quantity to be 0.8 μg.

After obtaining the gross pollutant quantity, the terminal calculates the pollutant absorption quantity according to the gross pollutant quantity and the filtration efficiency of the filter of the smart mask, as follows:

$$\text{Pollutant absorption quantity (μg)} = \text{Gross pollutant quantity (μg)} \times \text{Filtration efficiency of filter (\%)}.$$

For example, if the gross pollutant quantity is 0.8 μg and the filtration efficiency of the filter is 80%, then the terminal can calculate the pollutant absorption quantity to be 0.64 μg.

In some embodiments, after calculating the pollutant absorption quantity, the terminal uploads the pollutant absorption quantity to a server, which determines an absorption quantity ranking according to pollutant absorption quantities uploaded by various terminals and sends the absorption quantity ranking to the terminal. The terminal displays the absorption quantity ranking to the user after receiving the ranking from the server, such that the user can more directly appreciate the absorption performance of the smart mask and the local air quality.

Figure 6:
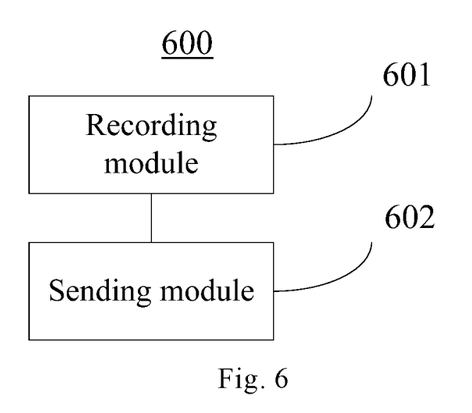
FIG. 6 is a block diagram of a smart mask according to another exemplary embodiment.

FIG. 6 is a block diagram of a smart mask 600 according to an exemplary embodiment. Referring to FIG. 6, the smart mask 600 includes a recording module 601 and a sending module 602. The recording module 601 is configured to record a wearing time during which a user wears the smart mask. The sending module 602 is configured to send the wearing time to a terminal for the terminal to calculate a pollutant absorption quantity according to the wearing time and a local air quality index during the wearing time.

In some embodiments, the smart mask further includes a connecting module. The connecting module is configured to start a Bluetooth function to establish a connection with the terminal via Bluetooth signals. Alternatively, the connecting module is configured to start an NFC function to establish a connection with the terminal via an NFC data channel. Alternatively, the connecting module is configured to start an infrared function to establish a connection with the terminal via infrared signals.

Figure 7:
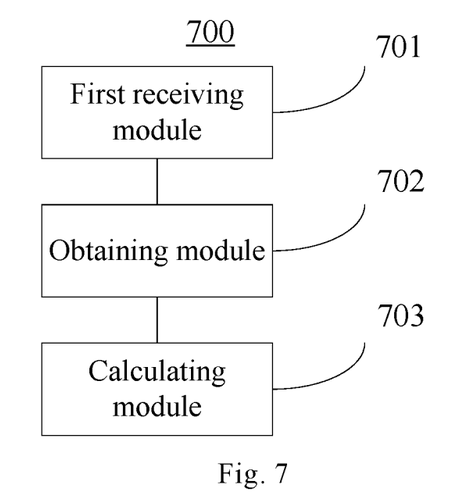
FIG. 7 is a block diagram of an apparatus for calculating a pollutant absorption quantity according to an exemplary embodiment.

FIG. 7 is a block diagram of an apparatus 700 for calculating a pollutant absorption quantity according to an exemplary embodiment. Referring to FIG. 7, the apparatus 700 includes a first receiving module 701, an obtaining module 702, and a calculating module 703. The first receiving module 701 is configured to receive a wearing time sent by a smart mask. The wearing time is recorded by a built-in sensor of the smart mask. The obtaining module 702 is configured to obtain a local air quality index during the wearing time. The calculating module 703 is configured to calculate a pollutant absorption quantity according to the wearing time and the local air quality index during the wearing time.

In some embodiments, the apparatus 700 further includes a connecting module. The connecting module is configured to start a Bluetooth function to establish a connection with the smart mask via Bluetooth signals. Alternatively, the connecting module is configured to start an NFC function to establish a connection with the smart mask via an NFC data channel. Alternatively, the connecting module is configured to start an infrared function to establish a connection with the smart mask via infrared signals.

In some embodiments, the obtaining module 702 is configured to obtain the local air quality index during the wearing time via the Internet or by a built-in air sensor.

In some embodiments, the calculating module 703 is configured to obtain a respiratory volume of a user in a first unit time; calculate a gross pollutant quantity according to the wearing time, the local air quality index during the wearing time, and the respiratory volume of the user in the first unit time; and calculate the pollutant absorption quantity according to the gross pollutant quantity and a filtration efficiency of a filter of the smart mask.

In some embodiments, the calculating module 703 is further configured to obtain respiratory parameters, e.g., the number of breaths and a respiratory volume of every breath, of the user in a second unit time, and to calculate the respiratory volume of the user in the first unit time according to the number of breaths in the second unit time and the respiratory volume of every breath.

In some embodiments, the calculating module 703 is further configured to obtain a motion state of the user and determine the respiratory parameters of the user in the second unit time according to the motion state of the user.

In some embodiments, the calculating module 703 is further configured to receive a physiological parameter of the user sent by a wearable device and to determine the motion state of the user according to the physiological parameter; or determine the motion state of the user according to a motion state of a terminal obtained by a built-in gravity sensor; or determine the motion state of the user according to a movement speed of the user detected by a built-in speed sensor.

In some embodiments, the apparatus further includes an uploading module and a second receiving module. The uploading module is configured to upload the pollutant absorption quantity to a server, which determines an absorption quantity ranking according to pollutant absorption quantities uploaded by various terminals and returns the absorption quantity ranking. The second receiving module is configured to receive the absorption quantity ranking returned by the server.

Figure 8:
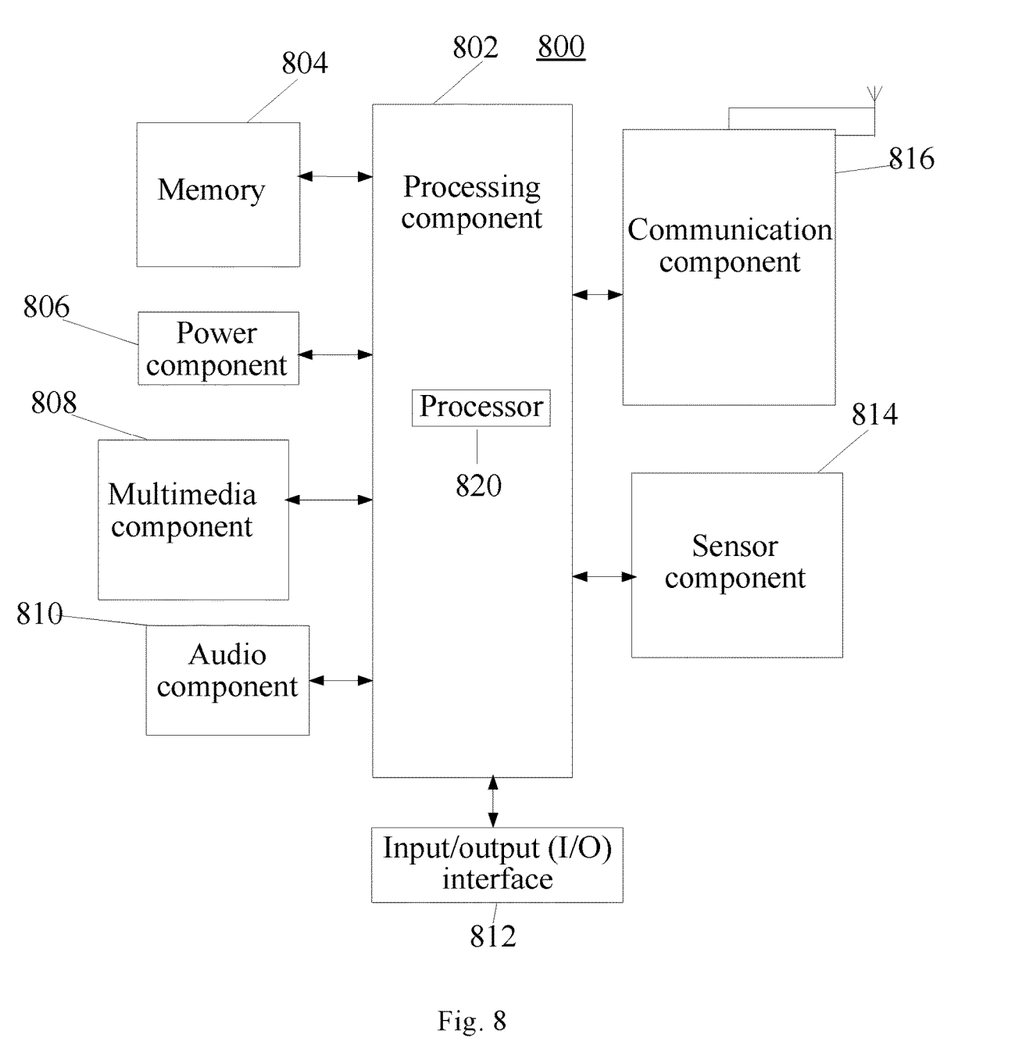
FIG. 8 is a block diagram of an apparatus for calculating a pollutant absorption quantity according to another exemplary embodiment.

Operations of the above-described exemplary smart masks and devices are similar to the exemplary methods described above, and thus their detailed description is omitted here FIG. 8 is a block diagram of an apparatus 800 for calculating a pollutant absorption quantity according to an example embodiment. For example, the apparatus 800 may be a mobile phone, a computer, a digital broadcasting terminal, a message sending and receiving equipment, a game controller, a tablet device, a medical device, fitness equipment, a personal digital assistant, or the like.

Referring to FIG. 8, the apparatus 800 includes one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, 3G, or 4G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the apparatus 800, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

According to the present disclosure, a wearing time during which a user wears a smart mask is recorded and sent to a terminal for calculating a pollutant absorption quantity and a local air quality index during the wearing time. As such, the local air condition can be intuitively displayed to the user.

Other embodiments of the present disclosure will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A smart mask, comprising:
    a main mask body including a first opening end and a second opening end, a diameter of the first opening end being smaller than a diameter of the second opening end;
    a front mask body arranged at the first opening end and including:
        a filter configured to absorb pollutants in air entering the front mask body;
        a sensor configured to record a wearing time of the smart mask;
        a processor including a connecting module and an integrated circuit board that includes a printed circuit board or a single-chip microcomputer; and
        a battery configured to supply power to the processor; and
    fixing straps arranged at the second opening end.

2. The smart mask according to claim 1, wherein the sensor includes at least one of a pressure sensor or a touch force sensor.

3. The smart mask according to claim 1, wherein the processor and the battery are arranged at an inner wall of the front mask body.

4. The smart mask according to claim 1, wherein the connecting module includes at least one of a Bluetooth module, an infrared module, or a near field communication module.

5. A smart mask, comprising:
    a processor including a connecting module and an integrated circuit board that includes a printed circuit board or a single-chip microcomputer;
    a memory storing instructions that, when executed by the processor, cause the processor to:
        record a wearing time during which a user wears the smart mask; and
        send the wearing time to a terminal; and
    a battery configured to supply power to the processor.

6. An apparatus for calculating a pollutant absorption quantity, comprising:
    a processor; and
    a memory storing instructions that, when executed by the processor, cause the processor to:
        receive a wearing time sent by a smart mask;
        obtain a local air quality index during the wearing time via Internet; and
        calculate the pollutant absorption quantity according to the wearing time and the local air quality index during the wearing time.

7. The apparatus according to claim 6, wherein the instructions further cause the processor to:
    start a Bluetooth function to establish a connection with the smart mask via Bluetooth signals.

8. The apparatus according to claim 6, wherein the instructions further cause the processor to:
    start a near field communication (NFC) function to establish a connection with the smart mask via an NFC data channel.

9. The apparatus according to claim 6, wherein the instructions further cause the processor to:
    start an infrared function to establish a connection with the smart mask via infrared signals.

10. The apparatus according to claim 6, wherein the instructions further cause the processor to obtain the local air quality index during the wearing time by a built-in air sensor.

11. The apparatus according to claim 6, wherein the instructions further cause the processor to calculate the pollutant absorption quantity by:
    obtaining a respiratory volume of a user wearing the smart mask in a first unit time;
    calculating a gross pollutant quantity according to the wearing time, the local air quality index, and the respiratory volume of the user in the first unit time; and
    obtaining the pollutant absorption quantity according to the gross pollutant quantity and a filtration efficiency of a filter of the smart mask.

12. The apparatus according to claim 11, wherein the instructions further cause the processor to obtain the respiratory volume of the user in the first unit time by:
    obtaining respiratory parameters of the user in a second unit time, the respiratory parameters including a number of breaths and a respiratory volume of every breath; and
    calculating the respiratory volume of the user in the first unit time according to the number of breaths in the second unit time and the respiratory volume of every breath.

13. The apparatus according to claim 12, wherein the instructions further cause the processor to obtain respiratory parameters of the user in the second unit time by:
    obtaining a motion state of the user; and
    determining the respiratory parameters of the user in the second unit time according to the motion state of the user.

14. The apparatus according to claim 13, wherein the instructions further cause the processor to obtain the motion state of the user by:
    receiving a physiological parameter of the user sent by a wearable device; and
    determining the motion state of the user according to the physiological parameter.

15. The apparatus according to claim 13, wherein the instructions further cause the processor to obtain the motion state of the user by:

determining the motion state of the user according to a motion state of the apparatus obtained by a built-in gravity sensor.

16. The apparatus according to claim 13, wherein the instructions further cause the processor to obtain the motion state of the user by:
   determining the motion state of the user according to a movement speed of the user detected by a built-in speed sensor.

17. The apparatus according to claim 6, wherein the instructions further cause the processor to:
   upload the pollutant absorption quantity to a server; and
   receive an absorption quantity ranking returned by the server.

* * * * *